(12) United States Patent
Nishizawa

(10) Patent No.: US 7,001,191 B2
(45) Date of Patent: Feb. 21, 2006

(54) CONDUCTIVE CONTACT ELEMENTS AND ELECTRIC CONNECTORS

(75) Inventor: Koji Nishizawa, Shiojiri (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 88 days.

(21) Appl. No.: 10/487,900

(22) PCT Filed: Jun. 26, 2003

(86) PCT No.: PCT/JP03/08090

§ 371 (c)(1),
(2), (4) Date: Feb. 26, 2004

(87) PCT Pub. No.: WO2004/003937

PCT Pub. Date: Jan. 8, 2004

(65) Prior Publication Data

US 2004/0203268 A1 Oct. 14, 2004

(30) Foreign Application Priority Data

Jun. 27, 2002 (JP) ............................ 2002-187676

(51) Int. Cl.
*H01R 4/58* (2006.01)

(52) U.S. Cl. .................... 439/90; 524/440; 524/588; 528/32

(58) Field of Classification Search ............... 524/440, 524/588; 439/90; 528/25
See application file for complete search history.

(56) References Cited

U.S. PATENT DOCUMENTS

| | | | |
|---|---|---|---|
| 3,680,037 A | | 7/1972 | Nellis et al. |
| 5,229,037 A | * | 7/1993 | Nakano et al. ............. 252/512 |
| 6,271,482 B1 | | 8/2001 | Crotzer et al. |
| 6,348,659 B1 | | 2/2002 | Crotzer et al. |
| 6,361,716 B1 | * | 3/2002 | Kleyer et al. ............... 252/514 |
| 6,433,057 B1 | * | 8/2002 | Bhagwagar et al. ......... 524/403 |
| 2003/0062983 A1 | * | 4/2003 | Duggal et al. ............. 338/22 R |

FOREIGN PATENT DOCUMENTS

| | | |
|---|---|---|
| EP | 1 090 959 A1 | 4/2001 |
| EP | 1 094 555 A2 | 4/2001 |
| GB | 2 248 979 A | 4/1992 |
| JP | 4 109510 A | 4/1992 |
| JP | 8-17671 A | 1/1996 |
| JP | 11-92626 A | 4/1999 |
| JP | 2000-299146 A | 10/2000 |
| JP | 2001107101 A * | 4/2001 |
| JP | 2002-109959 A | 4/2002 |

OTHER PUBLICATIONS

HRP Metals Product Data Sheet for SP-G14.*
Johnson Matthey Product Data Sheet for Silver Powder EG2233.*

* cited by examiner

*Primary Examiner*—Marc S Zimmer
(74) *Attorney, Agent, or Firm*—Birch, Stewart, Kolasch & Birch, LLP

(57) ABSTRACT

A conductive contact element is characterized by molding and curing a conductive silicone rubber composition comprising (A) 100 parts by weight of an organopolysiloxane having at least two aliphatic unsaturated groups represented by the average compositional formula (1):

$$R^1_n SiO_{(4-n)/2} \qquad (1)$$

wherein $R^1$ is each independently a substituted or unsubstituted monovalent hydrocarbon group, and n is a positive number of 1.98 to 2.02, (B) 300–700 parts by weight of a granular silver powder having a tap density of up to 2.0 g/cm$^3$ and a specific surface area of up to 0.7 m$^2$/g, and (C) an effective amount to cure component (A) of a curing agent for component (A).

3 Claims, 3 Drawing Sheets

(a)

(b)

(c)

US 7,001,191 B2

CONDUCTIVE CONTACT ELEMENTS AND ELECTRIC CONNECTORS

TECHNICAL FIELD

This invention relates to electroconductive contact elements and an electric connector comprising the same, used for electric connection in various electric and electronic equipment, typically in connecting a semiconductor package of the area array type like land grid array (LGA) or ball grid array (BGA) to a packaging board.

BACKGROUND ART

In the prior art, LGA or BGA semiconductor packages are connected to packaging boards by direct soldering or by means of movable pins held for vertical motion by leaf springs or coil springs. However, as the number of external connection terminals is increasing in current semiconductor packages tailored for higher performance and function, simultaneous connection using solder is deemed difficult from the standpoint of connection reliability. Also in conjunction with the speed-up of electric signals, the conventional leaf springs and coil springs can now interfere with the high speed signal transmission because they have an increased inductance component due to long distances of connection.

In view of the above-discussed problems, electric connectors in which a plurality of conductive elastomer elements penetrate through and are supported by an insulating substrate are recently under study. Silicone rubber compositions having metal powder compounded therein are advantageously used as the material of which the electric connectors are constructed. As the metal powder to be compounded in these silicone rubber compositions, silver powder is frequently used from the standpoints of resistance and cost. The silver powder is classified into a reduced silver powder obtained by reducing an aqueous silver nitrate solution with a reducing agent such as hydrazine, formaldehyde or ascorbic acid, an electrolytic silver powder obtained through electrolysis of an aqueous silver nitrate solution for depositing silver on a cathode, and an atomized silver powder obtained by heat melting silver at or above 1,000° C. and atomizing the silver melt into water or inert gas. The shape of these silver powders is divided into granular, flaky, dendritic and irregular shapes. In general, the granular silver powder has the tendency that particles agglomerate together, so that compounding of the silver powder in silicone rubber results in the inconsistency of resistance because the resistance value is likely to fluctuate depending on the dispersed state of silver particles. Thus, the granular silver powder is often used in combination with the flaky silver powder.

For the flaky silver powder, a certain manufacturing process is by grinding a silver powder while treating it with saturated or unsaturated higher fatty acids such as lauric acid, myristic acid, palmitic acid, stearic acid, and oleic acid, metal soaps, higher aliphatic amines, polyethylene wax or the like. However, the flaky silver powder by such a process can retard the vulcanization of silicone rubber to which the powder is added. It is also known that the silver powder which has not been treated as above results in the inconsistency of resistance of silicone rubber to which the powder is added.

An electric connector obtained by molding such a conductive silicone rubber composition in a mold or the like has an inconsistent conduction resistance when used in the mounting of a semiconductor package. As a result, the operation of the semiconductor package becomes unstable. Further, if compression of the semiconductor package to the packaging board is repeated, the agglomerated structure and chain of the silver powder are disrupted, resulting in a drastic increase of conduction resistance to inhibit repeated use.

DISCLOSURE OF THE INVENTION

The present invention has been made in view of the above-described circumstances, and its object is to provide conductive contact elements which have the consistency of conduction resistance when molded in a mold and suppress and prevent the conduction resistance from increasing on repeated use, and an electric connector comprising the same.

Making extensive investigations to achieve the above object, the inventors have discovered that when conductive contact elements and an electric connector are made using a silicone rubber composition having blended therein a granular silver powder having a tap density of up to 2.0 g/cm$^3$ and a specific surface area of up to 0.7 m$^2$/g as the silver powder, it becomes possible to improve the dispersion and minimize the agglomeration of silver powder, to ensure the consistency of conduction resistance when molded in a mold, and to suppress or prevent the conduction resistance from increasing upon repeated use. The present invention is predicated on this discovery.

Accordingly, the present invention provides a conductive contact element characterized in that a conductive silicone rubber composition comprising (A) 100 parts by weight of an organopolysiloxane having at least two aliphatic unsaturated groups represented by the average compositional formula (1):

$$R^1{}_n SiO_{(4-n)/2} \qquad (1)$$

wherein $R^1$ is each independently a substituted or unsubstituted monovalent hydrocarbon group, and n is a positive number of 1.98 to 2.02, (B) 300 to 700 parts by weight of a granular silver powder having a tap density of up to 2.0 g/cm$^3$ and a specific surface area of up to 0.7 m$^2$/g, and (C) an effective amount to cure component (A) of a curing agent for component (A)

is molded and cured; and an electric connector comprising the conductive contact elements.

BRIEF DESCRIPTION OF THE DRAWINGS

FIG. 3(a) being a cross-sectional view of a conductive silicone rubber composition resting on a substrate which is set in a mold; FIG. 3(b) being a cross-sectional view showing the heat compression molded state with the mold of FIG. 3(a) clamped; FIG. 3(c) being a cross-sectional view showing an electric connector having conductive contact elements integrally molded with the substrate, when taken out of the mold.

FIG. 4(a) illustrating conductive contact elements of generally barrel shape in cross section; FIG. 4(b) illustrating conductive contact elements of generally thick column shape in cross section; FIG. 4(c) illustrating conductive contact elements of generally thin column shape in cross section; FIG. 4(d) illustrating conductive contact elements of generally track-field shape in cross section.

FIG. 5(a) illustrating conductive contact elements of generally circular shape in cross section; FIG. 5(b) illustrating conductive contact elements in which the edges of upper and lower end portions are rounded by chamfering; FIG. 5(c) illustrating conductive contact elements of generally octagonal shape in cross section; FIG. 5(d) illustrating conductive contact elements having side walls which are partially curved.

THE BEST MODE FOR CARRYING OUT THE INVENTION

Figure 1:
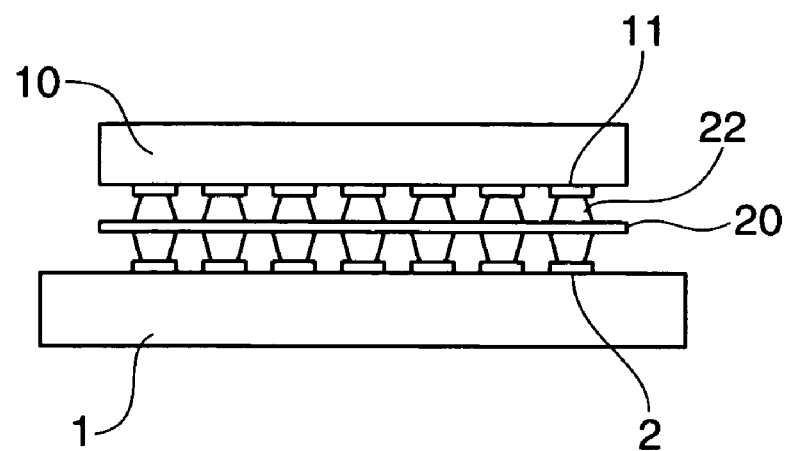
FIG. 1 is a side view of conductive contact elements and an electric connector according to the present invention disposed between a substrate and a semiconductor package.

The invention is described in further detail.

The electroconductive contact elements or pads of the invention are those obtained by molding and curing the above-described electroconductive silicone rubber composition.

Component (A) of the conductive silicone rubber composition is an organopolysiloxane having at least two aliphatic unsaturated groups represented by the average compositional formula (1) shown above.

In formula (1), $R^1$ which may be the same or different is a substituted or unsubstituted monovalent hydrocarbon group, preferably having 1 to 10 carbon atoms, more preferably 1 to 8 carbon atoms, typically selected from among alkyl groups such as methyl, ethyl, propyl and butyl, cycloalkyl groups such as cyclohexyl, alkenyl groups such as vinyl, allyl, butenyl and hexenyl, aryl groups such as phenyl and tolyl, aralkyl groups such as benzyl and phenylethyl, and the foregoing groups in which some or all of the hydrogen atoms attached to carbon atoms are substituted with halogen atoms, cyano groups or the like, such as chloromethyl, trifluoropropyl and cyanoethyl. Preferably $R^1$ is a methyl, vinyl or phenyl group, and more preferably methyl accounts for at least 50 mol %, especially at least 80 mol % of the entire $R^1$ groups.

The organopolysiloxane represented by the average compositional formula (1) should have at least two aliphatic unsaturated groups (especially alkenyl groups), while the content of aliphatic unsaturated groups in $R^1$ is preferably in a range of 0.001 to 20 mol %, especially 0.025 to 5 mol %. It is noted that the aliphatic unsaturated groups may be positioned at the ends of a molecular chain or side chains on a molecular chain, or both the ends and side chains.

The letter n is a positive number of 1.98 to 2.02. Generally the organopolysiloxane represented by the average compositional formula (1) is preferably of straight chain although a mixture of one or more organopolysiloxanes differing in molecular structure or molecular weight is acceptable. The organopolysiloxane should preferably have an average degree of polymerization of 100 to 10,000, especially 3,000 to 20,000.

Component (B), a second essential component in the invention is a granular silver powder having a tap density of up to 2.0 g/cm³ and a specific surface area of up to 0.7 m²/g.

In general, the constants representing the agglomeration of silver powder include a tap density (ISO 3953–1977) and a BET specific surface area. The silver powder used herein should have a tap density of up to 2.0 g/cm³ and a BET specific surface area of up to 0.7 m²/g. Their lower limits may be selected as appropriate although it is preferred that the tap density be at least 0.05 g/cm³, especially at least 0.1 g/cm³, and the BET specific surface area be at least 0.05 m²/g, especially at least 0.1 m²/g.

Such silver powder is commercially available as Silbest F20 (Tokuriki Chemical Research Co., Ltd.).

The particle size of the silver powder used herein is not critical although a particle size in the range of 0.05 to 100 μm is preferred, with an average particle size in the range of 1 to 10 μm being preferred. To form a silicone rubber having a low resistance, it is preferred that silver particles be partially joined rather than being completely independently dispersed.

The process of preparing a silver powder raw material as used herein is not particularly limited. For example, electrolytic, grinding, heat treatment, atomizing and reduction processes are included. Of these, the reduction process is preferred because a powder having both a low tap density and a low BET specific surface area is readily obtainable by controlling process parameters.

The silver powder may be ground to a range meeting the above-defined numerical ranges prior to use. The apparatus for grinding the silver powder is not particularly limited. For example, well-known apparatus such as a stamp mill, ball mill, vibration mill, hammer mill, rolling mill and mortar are included.

The preferred amount of component (B) or silver powder blended is 300 to 700 parts by weight, especially 400 to 600 parts by weight, per 100 parts by weight of component (A) or organopolysiloxane. Less than 300 parts by weight of component (B) or silver powder is too small to provide a consistent resistance whereas more than 700 parts by weight detracts from the mechanical properties of conductive silicone rubber, leading to reduced elasticity and degraded compression set.

It is noted that another conductive material other than the silver powder as component (B) may be added to the conductive silicone rubber composition of the invention as long as the object of the invention is not impaired.

Such conductive materials include conductive carbon black, conductive zinc white, conductive titanium oxide, etc., alone or in admixture of two or more.

The conductive carbon black used herein may be selected from those customarily used in conventional conductive rubber compositions, and examples include acetylene black, conductive furnace black (CF), super-conductive furnace black (SCF), extra-conductive furnace black (XCF), conductive channel black (CC), and furnace black and channel black which have been heat treated at elevated temperatures of about 1,500° C. Specific examples include acetylene blacks sold under the trade name of Denka Acetylene Black from Denki Kagaku Kogyo K. K. and Shawnigan Acetylene Black from Shawnigan Chemical Co.; conductive furnace blacks sold under the trade name of Continex CF from Continental Carbon and Vulcan C from Cabot Corp.; super-conductive furnace blacks sold under the trade name of Continex SCF from Continental Carbon and Vulcan SC from Cabot Corp.; extra-conductive furnace blacks sold under the trade name of Asahi HS-500 from Asahi Carbon Co., Ltd. and Vulcan XC-72 from Cabot Corp.; and conductive channel black sold under the trade name of Corax L from Degussa AG. Ketjen Black EC and Ketjen Black EC-600JD (Ketjen Black International) which belong to a class of furnace black are also useful. Of these, acetylene black is more conductive because of a low impurity content and a well developed secondary structure, and thus especially suited for use herein. Also useful are Ketjen Black EC and Ketjen Black EC-600JD which exhibit high conductivity even at low loadings due to their outstanding surface area.

An example of white conductive titanium oxide is ET-500W by Ishihara Industry Co., Ltd. It has a basic composition of $TiO_2 \cdot SnO_2$ preferably doped with Sb. It is noted that the amount of the other conductive material added is preferably 1 to 500 parts by weight, especially 2 to 300 parts by weight per 100 parts by weight of component (A).

Component (C), a third essential component of the inventive composition is a curing agent for component (A). The curing mechanism of the curing agent is not particularly limited as long as it helps the conductive silicone rubber composition vulcanize and cure by utilizing radical reaction, addition reaction or the like as often used for the vulcanization of conventional silicone rubber compositions. A variety of prior art well-known curing agents are useful. Specifically, organic peroxides are used for the radical reaction, and combinations of platinum base catalysts with organohydrogenpolysiloxanes are used for the addition reaction. Inter alia, organic peroxides are preferred. It is noted that the amount of the curing agent blended is an effective amount to cure component (A) or organopolysiloxane, as used in conventional conductive silicone rubber compositions.

More specifically, organic peroxide curing agents include benzoyl peroxide, 2,4-dichlorobenzoyl peroxide, o-methylbenzoyl peroxide, p-methylbenzoyl peroxide, 2,4-dicumyl peroxide, 2,5-dimethyl-2,5-di(tert-butylperoxy)-hexane, di-tert-butyl peroxide, and tert-butyl perbenzoate. The amount of organic peroxide blended is preferably 0.1 to 5 parts by weight per 100 parts by weight of component (A) or organopolysiloxane.

As to the curing agent for addition reaction, any well-known platinum base catalysts may be used. Examples include platinum element alone, platinum compounds, platinum composites, chloroplatinic acid, and complexes of chloroplatinic acid with alcohol compounds, aldehyde compounds, ether compounds and olefins. Preferably the platinum base catalyst is used in such amounts as to give 1 to 2,000 ppm of platinum atoms based on the weight of component (A) or organopolysiloxane.

The counterpart, organohydrogenpolysiloxane is one having at least two, especially at least three silicon atom-bonded hydrogen atoms (SiH groups) in a molecule, preferably represented by the following average compositional formula.

$$R_a H_b SiO_{(4-a-b)/2}$$

Herein, R is a monovalent hydrocarbon group as defined above for $R^1$, preferably free of aliphatic unsaturation, "a" and "b" are positive numbers satisfying $0 \leq a \leq 3$, $0 < b \leq 3$, and $0 < a+b \leq 3$, preferably $0 \leq a \leq 2.2$, $0.002 < b \leq 2$, and $1.002 \leq a+b \leq 3$.

While the organohydrogenpolysiloxane used herein has at least two, especially at least three SiH groups in a molecule, these groups may be positioned at the ends of or midway the molecular chain or both. The organohydrogenpolysiloxane preferably has a viscosity at 25° C. of 0.5 to 10,000 $mm^2/S$ (cSt), especially 1 to 300 $mm^2/S$.

The organohydrogenpolysiloxane may be either straight-chain, branched chain or cyclic, and preferably has a degree of polymerization of up to 300. Illustrative examples include diorganopolysiloxanes end-blocked with a dimethylhydrogensilyl group, copolymers consisting of dimethylsiloxane units, methylhydrogensiloxane units and terminal trimethylsiloxy units, low-viscosity fluids consisting of dimethylhydrogensiloxane units ($H(CH_3)_2SiO_{1/2}$ units) and $SiO_2$ units, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

The organohydrogenpolysiloxane is preferably added as the curing agent in such amounts that 50 to 500 mol % of hydrogen atoms directly bonded to silicon atoms (SiH groups) are available based on the aliphatic unsaturated groups (alkenyl groups) in component (A), organopolysiloxane.

In the conductive silicone rubber composition of the invention, reinforcing silica fillers such as silica hydrogel (hydrated silicic acid) and silica aerogel (silicic anhydride, fumed silica), fillers such as clay, calcium carbonate, diatomaceous earth and titanium dioxide, dispersants such as low-molecular-weight siloxane esters and diphenylsilane diol, heat resistance improvers such as iron oxide, cerium oxide and iron octylate, various carbon-functional silanes for improving adhesion or moldability, halogen compounds for imparting flame retardance or the like may be admixed if necessary and as long as the objects of the invention are not impaired.

In another embodiment, silica fines or the like may be premixed with the silver powder as component (B) for preventing the silver particles from agglomerating. The silica fines to be premixed preferably have a specific surface area of at least 50 $m^2/g$, and especially 100 to 300 $m^2/g$. Silica fines having a specific surface area of less than 50 $m^2/g$ may be less effective for preventing agglomeration. The silica fines include, for example, fumed silica and precipitated silica. Such silicas which are surface treated with chlorosilanes, hexamethyldisilazane, organopolysiloxanes or alkoxysilanes for hydrophobicization are also useful. The amount of silica blended may be 0 to 5 parts by weight, especially 0.5 to 2 parts by weight per 100 parts by weight of component (B).

To impart thermal conductivity, alumina, quartz flour or boron nitride powder may be added.

The silicone rubber composition used herein can be prepared by uniformly mixing the above-described components in a rubber mill such as a twin-roll mil, Banbury mixer or dough mixer (kneader), optionally followed by heat treatment.

The present invention is directed to conductive contact elements obtained by curing the above-described conductive silicone rubber composition and an electric connector comprising the conductive contact elements. When a semiconductor package is connected to a packaging board, the conductive contact elements should preferably have a volume resistivity of up to $1 \times^{-5}$ Ωm, especially up to $6 \times 10^{-6}$ Ωm, in order to maintain the conduction resistance at or below 50 Ωm.

The conductive contact elements and the electric connector are used for electrical connection in various electric and electronic equipment, business machines, mobile phones, and information terminal units. Specifically, they are used for electrical connection in packaging boards (e.g., printed circuit boards, flexible printed circuit boards), semiconductor packages, liquid crystal displays, batteries, electric acoustic parts, and miniature electronic parts, which constitute such equipment. Further, when conductive contact elements are supported by a substrate, they are for the most part of columnar or frustoconical shape. When conductive contact elements are not supported by a substrate, they may be formed to generally linear, tape, rod or block shape. The conductive contact elements may be either singular or plural.

Figure 2:
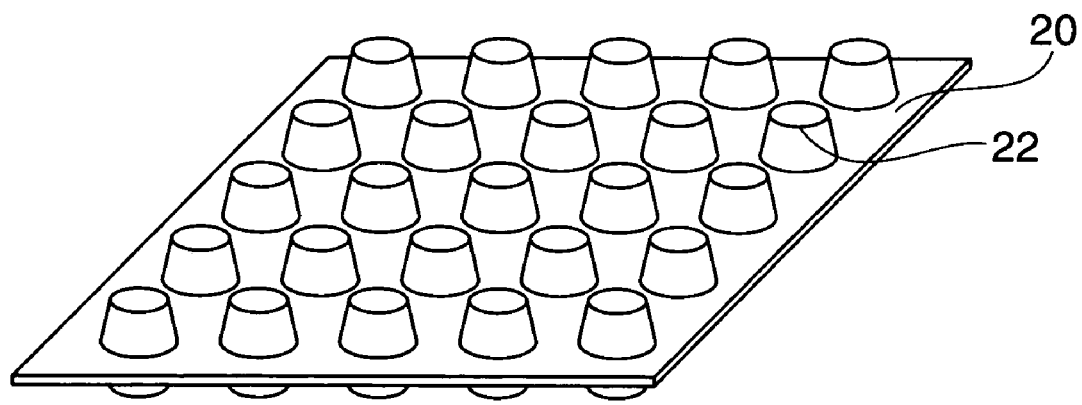
FIG. 2 is a perspective view of the conductive contact elements and electric connector according to the present invention.

Now referring to the drawings, a preferred embodiment of the invention is described. As shown in FIGS. 1 and 2, an electric connector according to the preferred embodiment includes a flat packaging board 1 and a semiconductor package 10 of the LGA type serving as opposed first and second members to be electrically joined, an insulating substrate 20 interposed between them and provided with a plurality of through-holes 21, and a plurality of elastic conductive contact elements or pads 22 fitted in and held by the through-holes 21 so that their opposite end portions protrude from the front and back sides of the insulating substrate 20 for electrically connecting a plurality of electrodes 2 and 11 on the packaging board 1 and the semiconductor package 10. Each of the elastic conductive contact elements 22 is formed of a cured product of the above-described conductive silicone rubber composition 23.

As shown in FIGS. 1 and 2, the insulating substrate 20 is formed as a thin plate of substantially square shape as viewed in plane, using a glass-reinforced epoxy resin or any well-known engineering plastics (e.g., PET, PEN, PEI, PPS, PEEK, liquid crystal polymers, polyimides, etc.) and perforated with a plurality of circular, small diameter, through-holes 21 extending throughout the plate in a thickness direction. The preferred material of the substrate 20 is an engineering plastic because of heat resistance, and especially a polyimide because of a low coefficient of thermal expansion. The thickness of the substrate 20 is preferably 25 $\mu$m to 3 mm, especially 50 to 200 $\mu$m for strength and efficient manipulation. Preferably the through-holes 21 are arrayed at a pitch of 0.5 to 1.27 mm and perforated to a diameter of 0.25 to 0.8 mm.

The conductive contact elements 22 each have a generally barrel shape in cross section obtained by combining a pair of frustocones and are fitted in and held by the through-holes 21 in the insulating substrate 20 so that their opposite end portions protrude from the front and back sides of the insulating substrate 20 for electrically connecting the electrodes 2 and 11 on the packaging board 1 and the semiconductor package 10.

Figure 3:
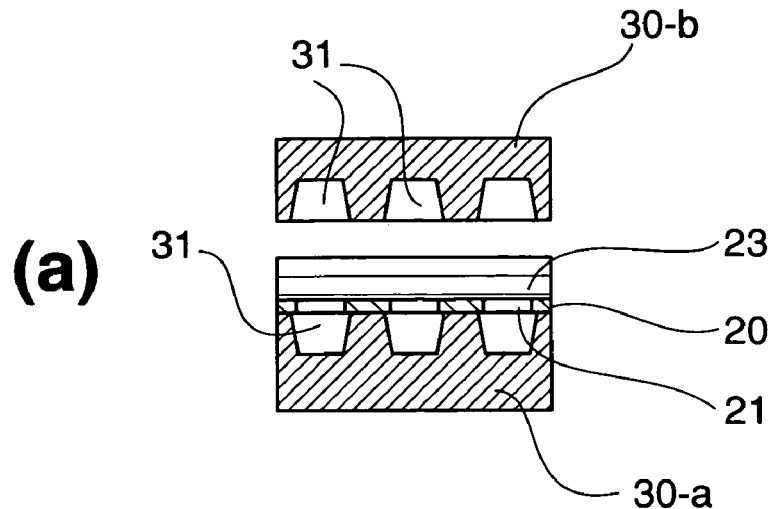
FIG. 3 illustrates a method of preparing conductive contact elements and an electric connector according to one embodiment of the present invention.
Figure 3:
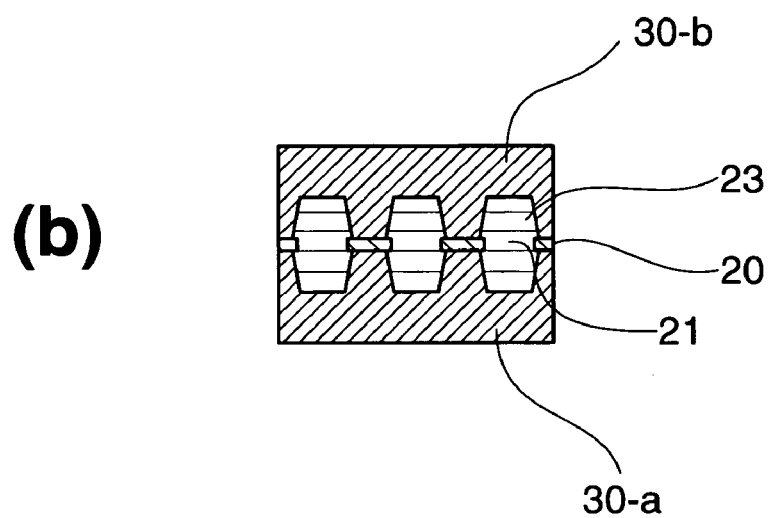
Figure 3:
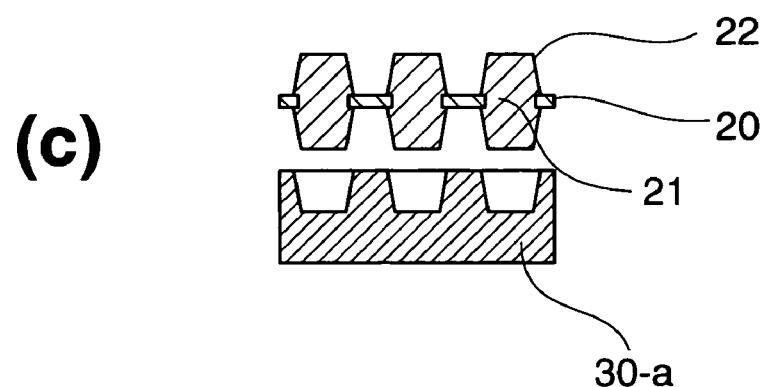

As shown in FIG. 3, the conductive contact elements 22 are manufactured by placing the conductive silicone rubber composition 23 in a mold 30 and molding the composition therein. The mold 30 includes a pair of upper and lower sections 30-a and 30-b having a plurality of frustoconical cavities 31 corresponding to the shape of the conductive contact elements 22.

The method of manufacturing an electric connector using the mold 30 is described. First of all, the substrate 20 is perforated with a plurality of through-holes 21 in a thickness direction and in a matrix pattern by such a technique as laser drilling or etching, and in register with the electrode 11 on the semiconductor package 10. Then the lower section 30-a of the mold 30 is placed in contact with the back side of the substrate 20. The conductive silicone rubber composition 23 in an amount requisite and sufficient to mold the conductive contact elements 22 is placed on the surface of the substrate 20 so as to cover the through-holes 21. The upper section 30-b of the mold 30 is rested on the conductive silicone rubber composition 23 whereby the substrate 20 is vertically sandwiched in the mold 30 (between the upper and lower mold sections 30-a and 30-b) as seen from FIG. 3a. With the mold 30 clamped, heat compression molding is carried out as seen from FIG. 3b. Then the conductive silicone rubber composition 23 flows through and fills in the through-holes 21 in the substrate 20, and the conductive silicone rubber composition 23 is molded and cured into the substantially barrel shape in cross section. An electrical connector having the conductive contact elements 22 integrated with the substrate 20 is manufactured as seen from FIG. 3c.

As shown in FIG. 1, the opposite end portions of the conductive contact elements 22 that protrude from the front and back sides of the substrate 20 in the electric connector thus manufactured are placed in contact with the electrodes 2 and 11 on the packaging board 1 and the semiconductor package 10. With the electric connector clamped between the packaging board 1 and the semiconductor package 10, the assembly is compressed at a reduction of 20%. Then the packaging board 1 and the semiconductor package 10 are kept in electric conduction through the electric connector.

It is noted that since the conductive contact elements 22 is compressed between the packaging board 1 and the semiconductor package 10, the rubber hardness is preferably in a range of 50 to 80, more preferably 60 to 80 in durometer type A hardness according to JIS K6253. If the rubber hardness of the conductive contact elements 22 is less than 50, there is a likelihood that no sufficient repulsive load be exerted and stable connection be unexpectable. With a rubber hardness of more than 80, there is a likelihood that the load required for compression become large enough to damage the packaging board 1 and the semiconductor package 10.

In the above manufacturing method, since the conductive contact elements 22 are molded from the conductive silicone rubber composition 23, it is unlikely that the conduction resistance changes largely or becomes unstable when molded in the mold 30. This stabilizes the operation of the semiconductor package 10 after mounting and enables continuous long-term use of the semiconductor package 10. Even when compression of the semiconductor package 10 against the packaging board 1 is repeated, it is possible to fully accommodate signal transmission at a higher speed because the conduction resistance is as low as 50 m$\Omega$ or less and the influence of external noise is minimized due to a short distance of connection.

Figure 4:
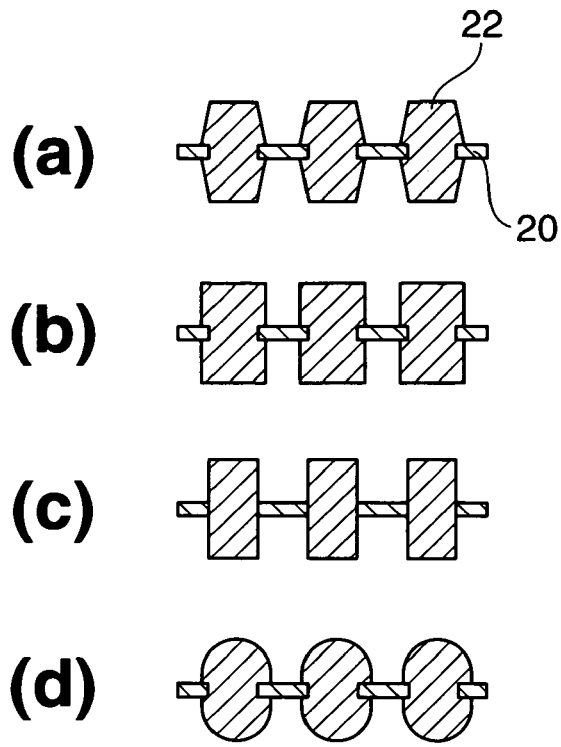
FIG. 4 illustrates conductive contact elements and an electric connector according to various embodiments of the present invention.
Figure 5:
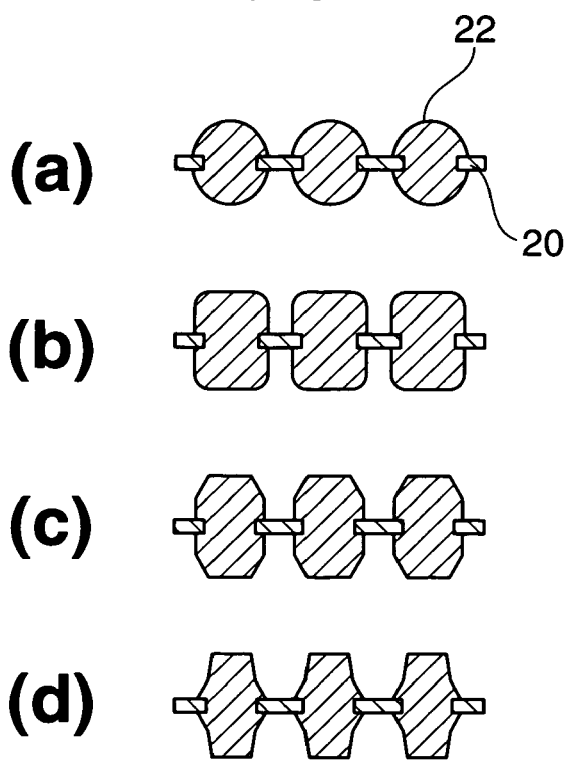
FIG. 5 illustrates conductive contact elements and an electric connector according to alternative embodiments of the present invention.

It is noted that although the conductive contact elements 22 are molded to a generally barrel cross-sectional shape having a pair of frustocones combined (as shown in FIG. 4a) in the foregoing embodiment, the shape of elements is not limited thereto and may be selected as appropriate depending on the shape of electrodes on the packaging board 1 and the semiconductor package 10, the load during conductive connection, and other factors. For example, the conductive contact elements 22 may be formed to a thick, generally column (either cylinder or prism) cross-sectional shape as shown in FIG. 4b; a thin, generally column cross-sectional shape as shown in FIG. 4d; or a generally track-field cross-sectional shape as shown in FIG. 4d. Alternatively, the conductive contact elements 22 may be formed to a generally circular or elliptic cross-sectional shape as shown in FIG. 5a; or the edges of upper and lower flat end portions of the conductive contact elements 22 may be rounded as shown in FIG. 5b. It is also possible that the conductive contact elements 22 be formed to a generally octagonal cross-sectional shape as shown in FIG. 5c; or the side walls of the conductive contact elements 22 be partially curved as shown in FIG. 5d. The upper and lower shapes may be the same or different (asymmetric). From the standpoints of resistance and load, a generally barrel cross-sectional shape having a pair of frustocones combined as shown in FIG. 4a is especially preferred.

EXAMPLE

Examples and Comparative Examples are given below for further illustrating the invention although the invention is not limited thereto. In Examples, all parts are by weight.

Example 1

A conductive silicone rubber composition was prepared by blending 100 parts of a methylvinylpolysiloxane consisting of 99.85 mol % of dimethylsiloxane units and 0.15 mol % of methylvinylsiloxane units, end-capped with a dimethylvinylsilyl group, and having an average degree of polymerization of about 8,000, 450 parts of granular silver powder A (average particle size 7.3 μm, tap density 1.4 g/cm$^3$, specific surface area 0.6 m$^2$/g, Silbest F20 by Tokuriki Chemical Research Co., Ltd.), and 0.5 part per 100 parts of the mixture of the methylvinylpolysiloxane and the silver powder A of dicumyl peroxide.

Next, a square insulating substrate of polyimide (100 μm thick) was perpendicularly drilled at a pitch of 1 mm to form 1156 (34×34) through-holes having a diameter of 0.5 mm. As shown in FIG. 3, the conductive silicone rubber composition prepared above was placed on the substrate so as to cover a plurality of through-holes. The insulating substrate at its front and back sides was clamped between the upper and lower sections of a mold where heat compression molding was carried out under molding conditions of 160° C. and 5 minutes, manufacturing an electric connector in which a plurality of conductive contact elements were integrated with the substrate. Each conductive contact element had a generally barrel cross-sectional shape having a pair of frustocones combined. For each conductive contact element, the generally barrel cross-sectional shape had a height of 1 mm, the narrow top of the frustocone had a diameter of 0.5 mm, the dilated bottom of the frustocone had a diameter of 0.6 mm, and the frustocone protruded 0.45 mm from the front or back side of the substrate.

The electric connector thus manufactured is clamped between a packaging board and a semiconductor package of the LGA type and compressed at a reduction of 20% to bring the packaging board and the semiconductor package in electric conduction through the electric connector. Measurement of conduction resistance of all the conductive contact elements gave an average value of 17 mΩ and a maximum value of 30 mΩ, indicating that all the conductive contact elements had a low resistance of up to 50 mΩ with a reduced variation. When compression operation was repeated 100 times, the resistance was found to have changed only 1.3 times the initial value.

Based on these measurements, the conduction resistance was converted to a volume resistivity according to the following equation (2), provided that the conductive contact element had a conduction cross-sectional area diameter of 0.5 mm and a conduction distance of 1 mm. For example, if the measurement of a conductive contact element is 50 mΩ, then the volume resistivity is calculated to be 9.8×10$^{-6}$ Ωm according to the equation.

$$\rho = R \times (A/L) \quad (2)$$

Herein, ρ is a volume resistivity, R is a measurement of conduction resistance, A is a conduction cross-sectional area, and L is a conduction distance.

Example 2

Conductive contact elements and an electric connector were prepared as in Example 1 except that a conductive silicone rubber composition was prepared by blending 100 parts of the methylvinylpolysiloxane, 500 parts of granular silver powder A (average particle size 7.3 μm, tap density 1.4 g/cm$^3$, specific surface area 0.6 m$^2$/g, Silbest F20 by Tokuriki Chemical Research Co., Ltd.), and 0.5 part per 100 parts of the mixture of the methylvinylpolysiloxane and the silver powder A of dicumyl peroxide.

A similar test to Example 1 showed an average value of 10 mΩ and a maximum value of 15 mΩ, indicating a low resistance with a minimized variation. When compression operation was repeated 100 times, the resistance was found to have changed only 1.1 times the initial value.

Comparative Example 1

Conductive contact elements and an electric connector were prepared as in Example 1 except that a conductive silicone rubber composition was prepared by blending 100 parts of the methylvinylpolysiloxane, 500 parts of a granular silver powder B (tap density 1.7 g/cm$^3$, specific surface area 1.5 m$^2$/g, AgC-Bo by Fukuda Metal Foil/Powder Industry Co., Ltd.), and 0.5 part per 100 parts of the mixture of the methylvinylpolysiloxane and the silver powder B of dicumyl peroxide.

A similar test to Example 1 showed an average value of 42 mΩ and a maximum value of 120 mΩ, indicating a high initial conduction resistance with a substantial variation. When compression operation was repeated 100 times, the conduction resistance increased considerably, with no satisfactory results being obtained.

Comparative Example 2

Conductive contact elements and an electric connector were prepared as in Example 1 except that a conductive silicone rubber composition was prepared by blending 100 parts of the methylvinylpolysiloxane, 500 parts of a granular silver powder C (tap density 3.0 g/cm$^3$, specific surface area 1.7 m$^2$/g, AgC-D by Fukuda Metal Foil/Powder Industry Co., Ltd.), and 0.5 part per 100 parts of the mixture of the methylvinylpolysiloxane and the silver powder C of dicumyl peroxide.

A similar test to Example 1 showed an average value of 51 mΩ and a maximum value of 220 mΩ, indicating a high initial conduction resistance with a substantial variation. When compression operation was repeated 100 times, some elements became non-conductive, with no satisfactory results being obtained.

TABLE 1

| Composition (pbw) | Tap density (g/cm$^3$) | Specific surface area (m$^2$/g) | Example 1 | Example 2 | Comparative Example 1 | Comparative Example 2 |
|---|---|---|---|---|---|---|
| Methylvinylpolysiloxane | | | 100 | 100 | 100 | 100 |
| Silver powder A | 1.4 | 0.6 | 450 | 500 | — | — |
| Silver powder B | 1.7 | 1.5 | — | — | 500 | — |
| Silver powder C | 3.0 | 1.7 | — | — | — | 500 |

TABLE 1-continued

| Composition (pbw) | | Tap density (g/cm³) | Specific surface area (m²/g) | Example 1 | Example 2 | Comparative Example 1 | Comparative Example 2 |
|---|---|---|---|---|---|---|---|
| Conduction resistance | Average (mΩ) | | | 17 | 10 | 42 | 51 |
| | Maximum (mΩ) | | | 30 | 15 | 120 | 220 |
| | Minimum (mΩ) | | | 9 | 6 | 19 | 23 |
| Volume resistivity (average, Ωm) | | | | 3.3 × 10⁻⁶ | 2.0 × 10⁻⁶ | 8.2 × 10⁻⁶ | 1.0 × 10⁻⁵ |
| Conduction resistance after 100 repeated compressions (average, mΩ) | | | | 22 | 11 | 218 | 660 |

According to the invention, the conductive silicone rubber composition can be molded into conductive contact elements while the conduction resistance is kept stabilized. There are obtained the conductive contact elements that can prevent their conduction resistance from increasing on repeated use as well as an electric connector comprising the same.

What is claimed is:

1. A conductive contact element characterized in that a conductive silicone rubber composition comprising (A) 100 parts by weight of an organopolysiloxane having at least two aliphatic unsaturated groups represented by the average compositional formula (1):

$$R^1{}_n SiO_{(4-n)/2} \tag{1}$$

wherein $R^1$ is each independently a substituted or unsubstituted monovalent hydrocarbon group, and n is a positive number of 1.98 to 2.02, (B) 300 to 700 parts by weight of a granular silver powder having a tap density of up to 2.0 g/cm³ and a specific surface area of up to 0.7 m²/g, and (C) an effective amount to cure component (A) of a curing agent for component (A) is molded and cured.

2. The conductive contact element of claim 1 having a volume resistivity of up to $1 \times 10^{-5}$ Ωm.

3. An electric connector for providing electric conduction between opposed first and second members to be electrically joined, characterized by comprising an insulating substrate interposed between said opposed first and second members to be electrically joined, the insulating substrate being provided with a plurality of through-holes, and conductive contact elements as set forth in claim 1 or 2 fitted in and held by the through-holes such that opposite end portions thereof protrude from front and back sides of the insulating substrate and contact said opposed first and second members to be electrically joined.

* * * * *